United States Patent
Ma

(10) Patent No.: US 12,223,111 B2
(45) Date of Patent: Feb. 11, 2025

(54) VIBRATION MOTOR DAMPING MEMBER WITH GROOVE

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventor: Jie Ma, Shenzhen (CN)

(73) Assignees: AAC Microtech (Changzhou) Co., Ltd., Changzhou (CN); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 235 days.

(21) Appl. No.: 17/947,194

(22) Filed: Sep. 19, 2022

(65) Prior Publication Data

US 2023/0315204 A1    Oct. 5, 2023

(30) Foreign Application Priority Data

Apr. 1, 2022 (CN) .......................... 202220773370.9

(51) Int. Cl.
*H02K 33/02* (2006.01)
*G06F 3/01* (2006.01)
*H02K 7/06* (2006.01)

(52) U.S. Cl.
CPC ............. *G06F 3/016* (2013.01); *H02K 7/061* (2013.01)

(58) Field of Classification Search
CPC ........ H02K 33/02; H02K 33/04; H02K 33/06; H02K 35/02; H02K 1/34; H02K 7/1876; G06F 3/016

USPC ........................................................... 310/81
See application file for complete search history.

(56) References Cited

U.S. PATENT DOCUMENTS

| | | | |
|---|---|---|---|
| 2017/0033672 A1* | 2/2017 | Xu | H02K 33/16 |
| 2017/0341108 A1* | 11/2017 | Mao | H02K 33/00 |
| 2017/0373577 A1* | 12/2017 | Huang | H02K 33/18 |
| 2018/0021812 A1* | 1/2018 | Akanuma | H02K 33/00 310/25 |

FOREIGN PATENT DOCUMENTS

JP    2003164133 A  *  6/2003

OTHER PUBLICATIONS

Machine translation of JP-2003164133-A. (Year: 2003).*

* cited by examiner

*Primary Examiner* — Michael Andrews
(74) *Attorney, Agent, or Firm* — W&G Law Group

(57) ABSTRACT

The present disclosure discloses a linear motor having a housing with an receiving space, a vibration unit and a stator unit received in the receiving space. The vibrator unit includes a weight and an elastic member fixed to the weight. The elastic member includes a first fixation portion fixed to the housing and a second fixation portion fixed to the weight and an elastic portion. An elastic member having a groove penetrating thereon is sandwiched between the elastic portion and the weight. The elastic member includes a first damping portion and a second damping portion arranged on two opposite side f the groove along a vibration direction. The groove can effectively avoid the detachment of the elastic member from the elastic member and the weight, thus improving the vibration stability of the vibration motor.

6 Claims, 4 Drawing Sheets

VIBRATION MOTOR DAMPING MEMBER WITH GROOVE

FIELD OF THE PRESENT DISCLOSURE

The present disclosure relates to tactile feedback technologies, especially relates to a vibration motor applied in mobile device.

DESCRIPTION OF RELATED ART

With the development of electronic technologies, portable consumable electronic products are increasingly popular, such as mobile phone, hand-held game console, navigating device or hand-held multimedia entertainment equipment, in which a vibration motor is generally used for system feedback, such as call reminder, message reminder, navigation reminder of mobile phone, vibration feedback of game console. To meet the demand of such a wide application, the vibration motor shall have high performance and long life.

A vibration motor of related art includes a housing with an receiving space, a vibration unit received in the receiving space and a stator unit fixed on the housing. The vibration unit usually includes a weight, an elastic member configured to suspend the weight in the housing and a damping member sandwiched between the weight and the elastic member. The damping member is configured to reduce noise caused by collision between the weight and the elastic member during vibration.

In related art, the damping member is glued on the weight and abuts to the elastic member. However, the damping member is easily disengaged from the elastic member during rebounding when the vibration unit has an excessive displacement, thus changing the damping of the vibration motor and accordingly reducing the vibration performance of the vibration motor. Besides, when the damping member is glued to the elastic member, on the one hand, due to its low tensile ductility, the damping member is prone to disengaged from the elastic member or the weight; on the other hand, the stretched damping member may provide greater damping to further suppress the vibration stability of the vibration motor.

Therefore, it is necessary to provide an improved vibration motor to overcome the problems mentioned above.

SUMMARY OF THE INVENTION

The present disclosure provides a vibration motor with higher vibration stability.

The vibration motor includes a housing with an receiving space; a vibration unit received in the receiving space, including: a weight; a magnet fixed to the weight; and an elastic member configured to suspend the weight in the receiving space, including: a first fixation portion fixed to the housing; a second fixation portion fixed to the weight; and an elastic portion connecting the first fixation portion and the second fixation portion, spaced apart from the weight; a stator unit received in the receiving space, including a coil facing the magnet; and a damping member sandwiched between the elastic portion and the weight, having a groove penetrating thereon, comprising: a first damping portion connecting with the elastic portion; and a second damping portion connecting with the weight; wherein the first damping portion and the second damping portion are separately arranged on two opposite sides of the groove along a vibration direction of the vibration unit.

Further, the damping member includes a first side surface and a second side surface spaced apart from the first side surface along a first direction perpendicular with the vibration direction; the groove dents from the first side surface towards the second side surface; the groove is spaced apart from the second side surface.

Further, the damping member includes a connection portion connecting the first damping portion and the second damping portion.

Further, the groove extends along the first direction.

Further, the groove penetrates the damping member along a second direction perpendicular with the vibration direction and the first direction.

Further, the weight includes a third side surface fixed to the second damping portion and a denting portion denting from the third side surface along the vibration direction; the second damping portion includes a main body spaced apart from the first damping portion along the vibration direction and a extending portion extending from the main body and received in the denting portion.

Further, the main body is attached to the third side surface.

Further, the extending portion is glued to the weight; the first damping portion is glued to the elastic portion.

Further, the damping member includes at least two grooves arranged at intervals along the vibration direction.

Further, the damping member is made of foam.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
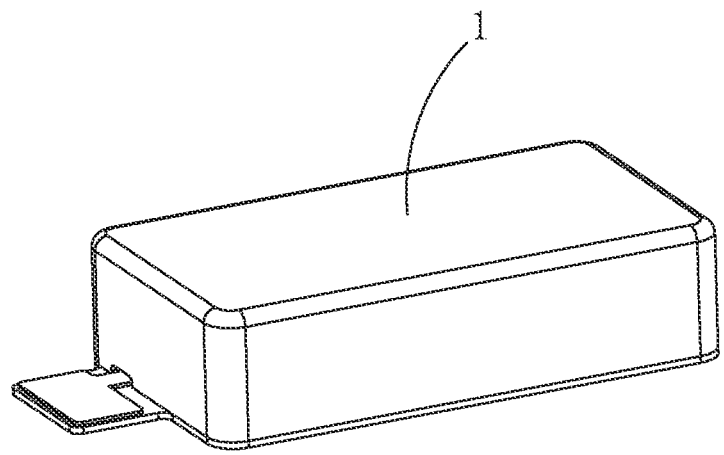
FIG. 1 is an isometric view of a vibration motor in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-6 together, a vibration motor 100 provided by an exemplary embodiment of the present disclosure includes a housing 1 with an receiving space 10, a vibration unit 2 and a stator unit 3 both received in the receiving space 10.

The housing 1 includes an upper cover 11 and a bottom cover 12 fixed to the upper cover 21 and enclosing the receiving space 10 with the upper cover 11. The stator unit 3 is fixed to the bottom cover 12.

The vibration unit 2 includes a weight 21, a magnet 22 fixed to the weight 21 and an elastic member 23 configured to suspend the weight 21 in the receiving space 10. In this embodiment, the vibration unit 2 further includes a magnetic plate 24 sandwiched between the weight 21 and the magnet 22 for converging the magnetic field of the magnet 22.

The stator unit 3 includes an iron core 31 facing the magnet 22, a coil 32 wound around the iron core 31 and a FPC (flexible printed circuit board) 33 fixed to the bottom cover 12. The FPC 33 is electrically connected with the coil 32. The coil 32 is electrically activated to interact with the magnet 22 so that the elastic member 23 drives the weight 21 to reciprocate along a vibration direction, by which provides vibration feedback.

Figure 2:
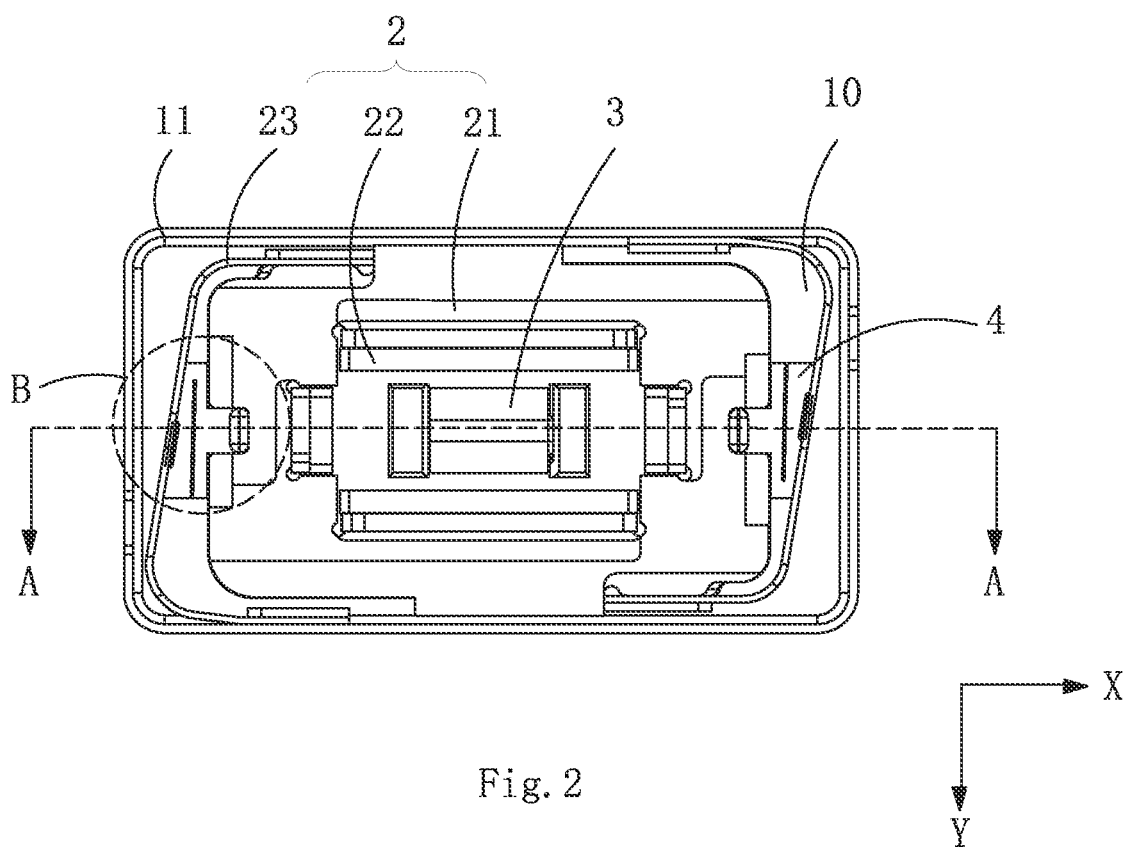
FIG. 2 is a bottom view of the vibration motor in FIG. 1 without a bottom cover.
Figure 3:
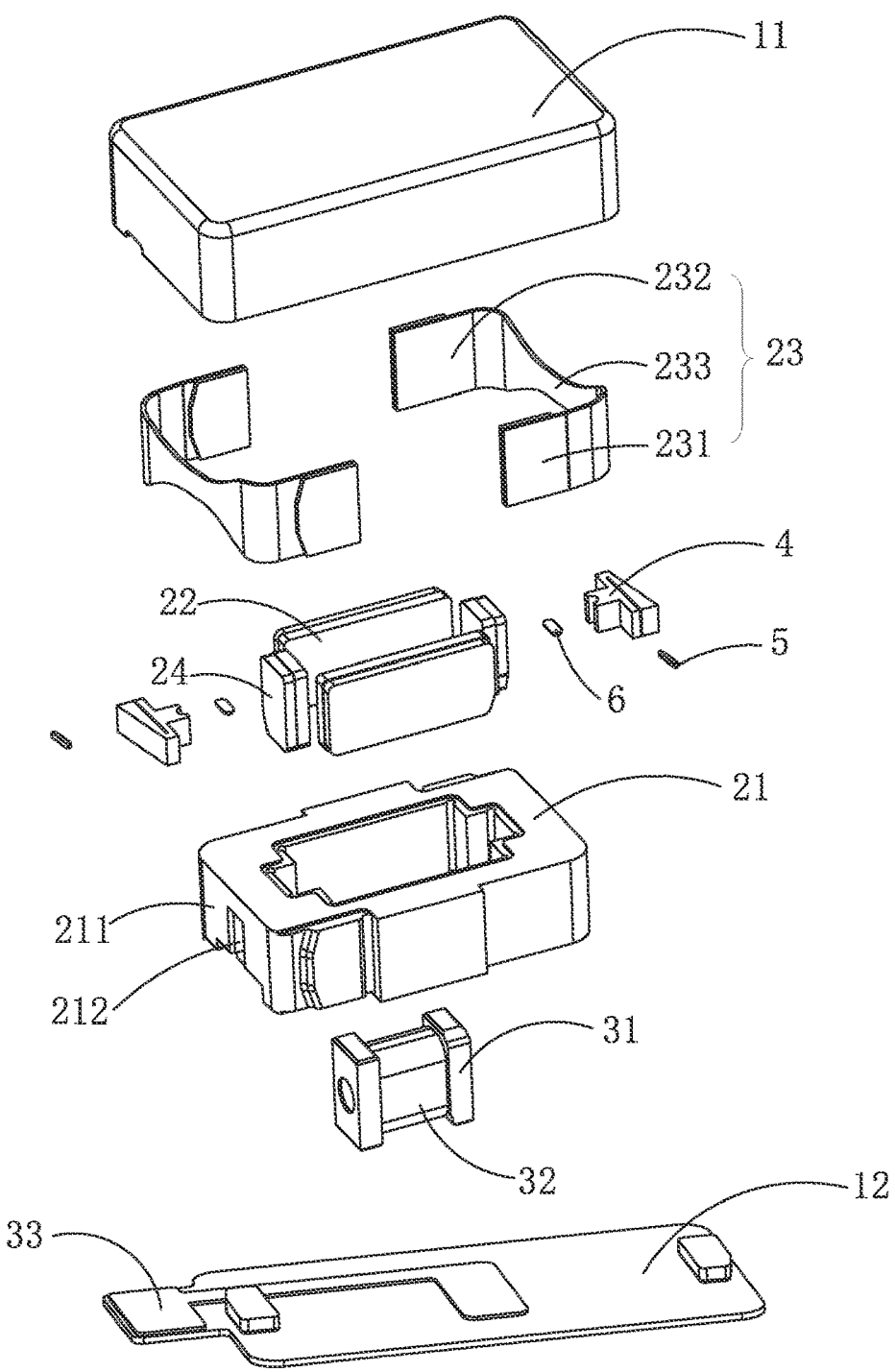
FIG. 3 is an exploded view of the vibration motor in FIG. 1.
Figure 4:
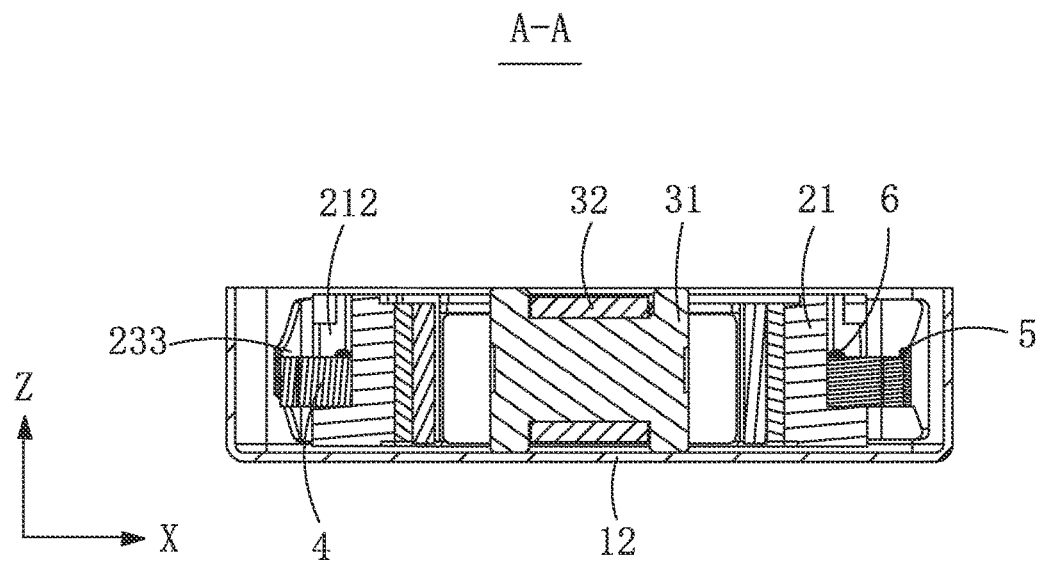
FIG. 4 is a cross-sectional view of the vibration motor taken along line A-A in FIG. 2.

As shown in FIG. 2-FIG. 4, the elastic member 23 includes a first fixation portion 231 fixed to upper cover 11, a second fixation portion 232 fixed to the weight 21, and an elastic portion 233 connecting the first fixation portion 231 and the second fixation portion 232. The elastic portion 233 is spaced apart from the weight 21 along a vibration direction X. Furthermore, for avoiding noise caused by collision between the elastic portion 233 and the weight 21 during vibration, the vibration unit 2 further includes a damping member 4 sandwiched between the elastic portion 233 and the weight 21. The damping member 4 includes a groove 41 penetrating thereon. Additionally, the damping member 4 further includes a first damping portion 42 connecting with the elastic portion 233 and a second damping portion 43 connecting with the weight 21. The first damping portion 42 and the second damping portion 43 are separately arranged on two opposite sides of the groove 41 along the vibration direction X. It should be understood that the damping member 4 further includes a connection portion 44 connecting the first damping portion 42 and the second damping portion 43. Specifically, the first damping portion 42 and the second damping portion 42 are divided by the groove 41, thus improving the stretch deformation of the damping member 4 along the vibration direction X. Moreover, for protecting the damping member 4 from fracture, the connection portion 44 connecting the first damping portion 42 and the second damping portion 43 should be wide enough the ensure the reliability of the damping member 4.

Figure 5:
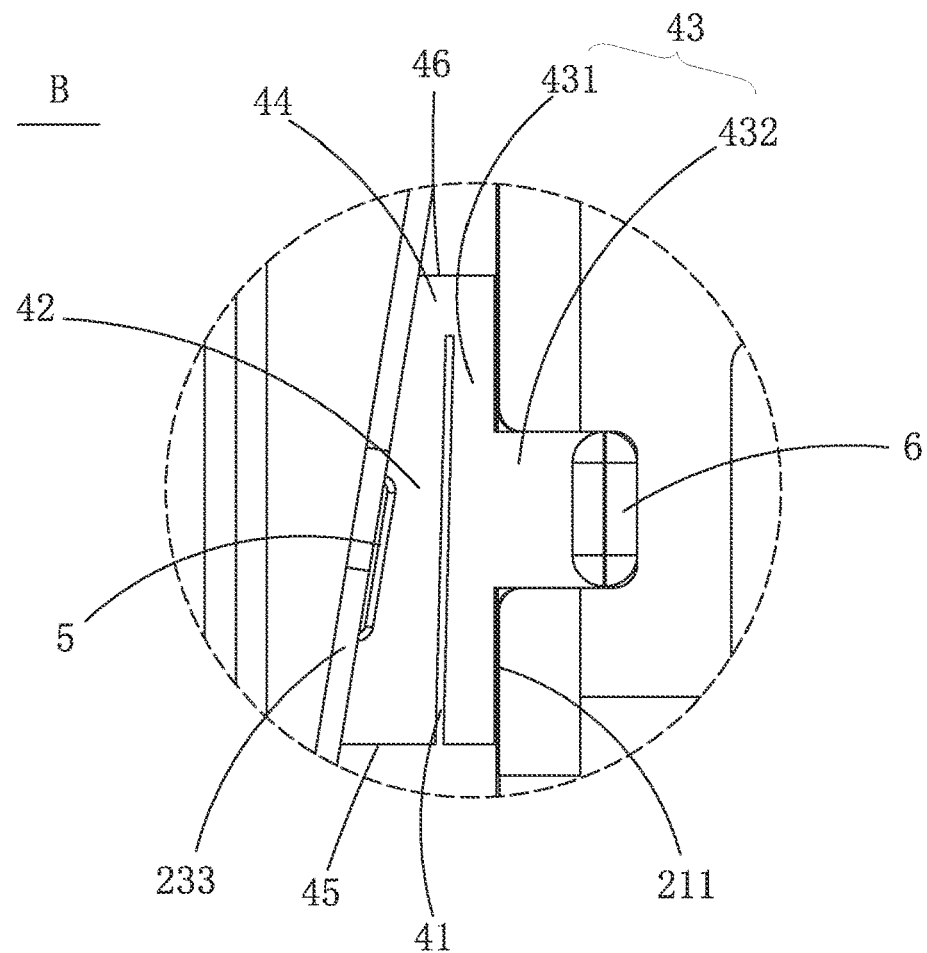
FIG. 5 is an enlarged view of part B in FIG. 2.
Figure 6:
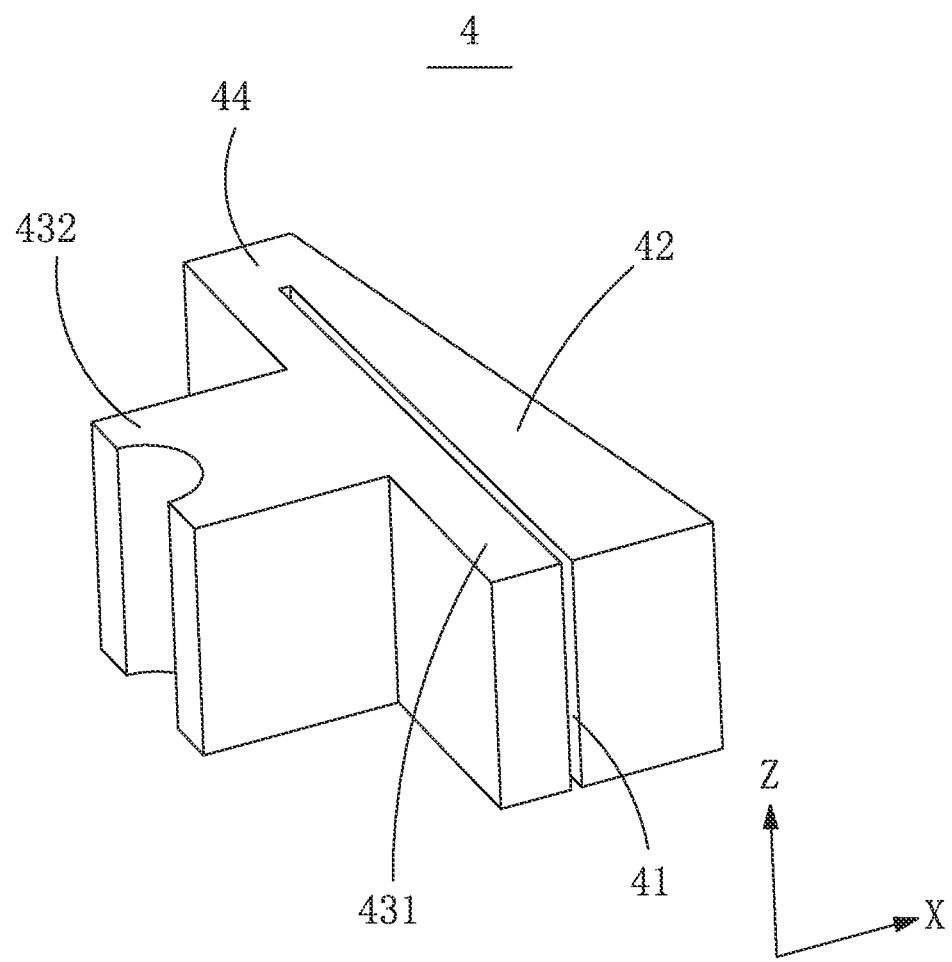
FIG. 6 is an isometric view of an elastic member of the vibration motor in FIG. 1.

As shown in FIG. 5 and FIG. 6, the damping member 4 further includes a first side surface 45 and a second side surface 46 spaced apart from the first side surface 45 along a first direction Y perpendicular with the vibration direction X. It can be understood that the first direction Y and the vibration direction X are in the same plane. Furthermore, the groove 41 dents from the first side surface 45 towards the second side surface 46. But the groove 41 is spaced apart from the second side surface 46. In other word, the groove 41 does not penetrate the second side surface 46. Please refer to FIGS. 2-6, the groove 41 extends along the first direction Y. Besides, the groove 41 penetrates the damping member 4 along a second direction Z perpendicular with the vibration direction X and the first direction Y.

The weight 21 further includes a third side surface 211 fixed to the second damping portion 43 and a denting portion 212 denting from the third side surface 211 along the vibration direction X. The second damping portion 43 includes a main body 431 spaced apart from the first damping portion 42 along the vibration direction X and a extending portion 432 extending from the main body 431 and received in the denting portion 212. In this way, a fixation area between the damping member 4 and the weight 21 is increased to effectively improve the bond strength between the damping member 4 and the weight 21. It can be understood that the extending portion 432 is glued to the weight 21 and received in the denting portion 212. As shown in FIG. 6, a first adhesive member 6 is provided to attach the extending portion 432 onto the weight 21. Similarly, the first damping portion 42 is also glued to the elastic portion 233 via a second adhesive member 5, thus further improving the stability of the elastic member 4 and effectively avoiding the detachment of the elastic member 4 during vibration. In this embodiment, the elastic member 4 is made of foam and only one groove 41 is provided on the elastic member 4. Also, the damping member 4 can further include at least two grooves 41 arranged at intervals along the vibration direction X. Moreover, as shown in FIG. 5-FIG. 6, a width of the elastic member 4 is variable along the vibration direction X. More specifically, a width of the connection portion 44 is relatively smaller. Therefore, an opening of the groove 41 is provided on a part of the elastic member 4 having a larger width than the connection portion 44 to improve the ductility of the elastic member 4 during deformation.

Compared with the related art, in the vibration motor of the present disclosure, the damping member is sandwiched between the weight and the elastic portion of the elastic member. The first damping portion and the second damping portion of the elastic member are arranged on two opposite sides of the groove along the vibration direction. By providing the groove on the elastic member, the damping of the elastic member after tensile deformation is decreased, and the tensile ductility of the elastic member is accordingly improved, thus effectively avoiding the detachment of the elastic member from the elastic portion and the weight and improving the vibration stability of the vibration motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
   a housing with a receiving space;
   a vibration unit received in the receiving space, comprising:
   a weight;
   a magnet fixed to the weight; and
   an elastic member configured to suspend the weight in the receiving space, comprising:
   a first fixation portion fixed to the housing;
   a second fixation portion fixed to the weight; and
   an elastic portion connecting the first fixation portion and the second fixation portion, spaced apart from the weight;
   a stator unit received in the receiving space, comprising a coil facing the magnet; and
   a damping member sandwiched between the elastic portion and the weight, having a groove penetrating thereon, comprising:
   a first damping portion connecting with the elastic portion; and a second damping portion connecting with the weight;

wherein the first damping portion and the second damping portion are separately arranged on two opposite sides of the groove along a vibration direction of the vibration unit;

the damping member further comprises a first side surface and a second side surface spaced apart from the first side surface along a first direction perpendicular with the vibration direction; the groove dents from the first side surface towards the second side surface; the groove is spaced apart from the second side surface;

the groove extends along the first direction; the groove penetrates the damping member along a second direction perpendicular with the vibration direction and the first direction;

a width of the first side surface along the vibration direction is larger than a width of the second side surface along the vibration direction.

2. The vibration motor as described in claim 1, wherein the damping member further comprises a connection portion connecting the first damping portion and the second damping portion.

3. The vibration motor as described in claim 1, wherein the weight comprises a third side surface fixed to the second damping portion and a denting portion denting from the third side surface along the vibration direction; the second damping portion comprises a main body spaced apart from the first damping portion along the vibration direction and a extending portion extending from the main body and received in the denting portion.

4. The vibration motor as described in claim 3, wherein the main body is attached to the third side surface.

5. The vibration motor as described in claim 3, wherein the extending portion is glued to the weight; the first damping portion is glued to the elastic portion.

6. The vibration motor as described in claim 1, wherein the damping member is made of foam.

* * * * *